(12) United States Patent
Gonzales et al.

(10) Patent No.: US 8,640,677 B2
(45) Date of Patent: Feb. 4, 2014

(54) ELECTROSTATIC AIR CHARGING SYSTEM FOR AN INTERNAL COMBUSTION ENGINE

(76) Inventors: James Gonzales, Redlands, CA (US); James R. Rosa, Redlands, CA (US)

( * ) Notice: Subject to any disclaimer, the term of this patent is extended or adjusted under 35 U.S.C. 154(b) by 553 days.

(21) Appl. No.: 12/752,294

(22) Filed: Apr. 1, 2010

(65) Prior Publication Data

US 2010/0252007 A1 Oct. 7, 2010

Related U.S. Application Data

(60) Provisional application No. 61/211,549, filed on Apr. 1, 2009.

(51) Int. Cl.
F02M 27/00 (2006.01)

(52) U.S. Cl.
USPC .......................................... 123/537; 123/536

(58) Field of Classification Search
USPC ................................................. 123/537, 536
See application file for complete search history.

(56) References Cited

U.S. PATENT DOCUMENTS

| | | | | |
|---|---|---|---|---|
| 3,711,743 A | | 1/1973 | Bolasny ............................. 317/3 |
| 3,788,293 A | * | 1/1974 | Anderson ...................... 123/620 |
| 3,841,824 A | | 10/1974 | Bethel ................................ 431/8 |
| 3,878,469 A | | 4/1975 | Bolasny ......................... 328/233 |
| 4,023,544 A | * | 5/1977 | Cole ............... 123/537 |
| 4,051,826 A | | 10/1977 | Richards ....................... 123/143 |
| 4,069,665 A | | 1/1978 | Bolasny .......................... 60/275 |
| 4,176,637 A | * | 12/1979 | Cole ............... 123/537 |
| 4,232,355 A | | 11/1980 | Finger et al. ................... 361/235 |
| 4,344,401 A | | 8/1982 | Masaki .......................... 123/536 |
| 4,347,825 A | | 9/1982 | Suzuki et al. ................. 123/537 |
| 4,355,969 A | | 10/1982 | Nelson et al. ..................... 431/4 |
| 4,373,494 A | | 2/1983 | McMahon ..................... 123/538 |
| 4,380,978 A | | 4/1983 | Maynard, Jr. et al. ........ 123/275 |
| 4,439,980 A | | 4/1984 | Biblarz et al. ............... 60/39.06 |
| 4,519,357 A | | 5/1985 | McAllister ..................... 123/539 |
| 5,009,858 A | * | 4/1991 | Mechtersheimer ...... 422/186.19 |
| 5,010,869 A | * | 4/1991 | Lee ................................ 123/539 |
| 5,243,950 A | | 9/1993 | Dalupan ........................ 123/573 |
| 5,329,911 A | | 7/1994 | Jeong ............................ 123/538 |
| 5,487,874 A | | 1/1996 | Gibboney, Jr. ........... 422/186.03 |
| 5,507,267 A | | 4/1996 | Stuer ............................. 123/537 |
| 5,671,719 A | | 9/1997 | Jeong ............................ 123/538 |
| 5,907,243 A | * | 5/1999 | Goras et al. ................... 324/388 |
| 5,977,716 A | * | 11/1999 | Motouchi ................ 315/111.91 |
| 5,992,397 A | | 11/1999 | Hideaki et al. ................ 123/538 |
| 6,000,383 A | * | 12/1999 | Diotte et al. .................. 123/573 |
| 6,272,840 B1 | | 8/2001 | Crocker et al. ............. 60/39.06 |

(Continued)

FOREIGN PATENT DOCUMENTS

EP 0 581 230 A3 2/1994

*Primary Examiner* — Marguerite McMahon
*Assistant Examiner* — James Kim
(74) *Attorney, Agent, or Firm* — Brooks Kushman P.C.

(57) ABSTRACT

An electrostatic air charging system that includes a primary electro-forming exciter (PEFE) having a plurality of tubes that define chambers that receive electrically conductive elements to electrostatically charge the air within an air intake assembly. The system further includes an electric conduit that directs low voltage current to the electrically conductive elements. The charging system further also includes a secondary electro-forming exciter (SEFE) within a positive crankcase ventilation system and connected to a ground within a vehicle. The SEFE includes a secondary tube that defines a secondary chamber having a secondary electrically conductive element disposed therein to electrostatically charge the particles within a positive crankcase ventilation system to provide greater combustion efficiency.

20 Claims, 6 Drawing Sheets

(56) References Cited

U.S. PATENT DOCUMENTS 6,497,753 B1 * 12/2002 Gutmann ........................ 96/55
6,502,562 B1    1/2003 Manalo ....................... 123/536
2006/0272504 A1 * 12/2006 Nutsos ............................. 96/69
2008/0006249 A1 *  1/2008 Evangelista .................. 123/536
2009/0133675 A1 *  5/2009 Clack ............................ 123/537

* cited by examiner

ELECTROSTATIC AIR CHARGING SYSTEM FOR AN INTERNAL COMBUSTION ENGINE

CROSS-REFERENCE TO RELATED APPLICATION(S)

This application claims the benefit of U.S. provisional patent application entitled "Combustion-enhancing system, method and apparatus for an internal combustion engine," having Ser. No. 61/211,549, and filed on Apr. 1, 2009.

BACKGROUND OF THE INVENTION

1. Field of the Invention

The present invention relates, generally, to internal combustion engines and, more specifically, to an electrostatic air charging system for an internal combustion engine to provide improved fuel combustion and method of accomplishing the same.

2. Description of the Related Art

Internal combustion engines include a combustion chamber where chemical energy is converted into mechanical work. More specifically, a mixture of atomized air and fuel is injected into the combustion chamber and ignited. The combustion of air/fuel mixture drives the piston which generates movement of "downstream" components of the engine. Conventional internal combustion engines operate at a very low level of fuel combustion efficiency. By way of example, a conventional gasoline internal combustion engine operates at a fuel combustion efficiency of approximately 20% and a diesel fuel internal combustion engines operates at a fuel combustion efficiency of approximately 40%. In either event, a majority of air/fuel mixture within combustion chamber is not utilized.

One factor contributing to the low level of fuel combustion efficiency is the lack of a homogenous air/fuel mixture within the combustion chamber. More specifically, the fuel and air within the combustion chamber combine to form an atomized mixture having substantially different sized particles of combustible media. Non-homogenous sized particles of air/fuel mixture within the combustion chamber will combust at different rates. As a result, only a portion of the atomized air/fuel mixture is utilized to drive the piston before the remaining air/fuel mixture is expelled from the combustion chamber, which contributes to the low level of fuel combustion efficiency in internal combustion engines.

Thus, one manner of improving combustion efficiency within internal combustion engines is to provide a substantially homogenous air/fuel particle size within the combustion chamber to provide more piston drive. Accordingly, there is a need in the art for a system that is adapted for use in connection with an internal combustion engine that will provide a substantially homogenous air/fuel particle size. More specifically, there is a need in the art for an electrostatic air charging system for an internal combustion engine to provide improved fuel combustion and method of accomplishing the same. Additionally, there is a need in the art for a system that electrostatically charges the air within an internal combustion engine to increase fuel atomization for improved fuel combustion efficiency. Furthermore, there is a need in the art for a system that enhances the combustion of an internal combustion engine by maintaining/creating optimum particle size fuel compounds that provide more efficient complete combustion to reduce pollutants within the engine exhaust.

SUMMARY OF THE INVENTION

The present invention overcomes many limitations and disadvantages in the related art in internal combustion engine fuel efficiency. According to one embodiment, the electrostatically air charging system includes a primary electro-forming exciter that is operatively disposed within an air intake assembly for an internal combustion engine. The primary electro-forming exciter includes a plurality of tubes that define a plurality of chambers, each having an inlet and an outlet. The primary electro-forming exciter further includes a plurality of electrically conductive elements that are adapted to electrostatically charge the air within an air intake assembly. Each one of the plurality of electrically conductive elements is operatively disposed within one of the chambers and adapted to receive an electric charge to electrostatically charge the air that is received through each chamber. The charging system further includes an electric voltage conduit that is operatively connected to the primary electro-forming exciter and an electric source to direct current within a predetermined range of 12-56V from an electric source to the electrically conductive elements. The charging system further also includes a secondary electro-forming exciter that is operatively disposed within a positive crankcase ventilation system for an internal combustion engine. The secondary electro-forming exciter is connected to an electrically grounded substrate within a vehicle and includes at least one secondary tube that defines a secondary chamber having an inlet and an outlet. The secondary electro-forming exciter further includes a secondary electrically conductive element that is operatively disposed within the secondary chamber to electrostatically charge the particles within a positive crankcase ventilation system. The primary electro-forming exciter and the secondary electro-forming exciter cooperate to charge particles for combustion within an internal combustion engine to provide greater combustion efficiency.

According to another embodiment of the present invention, the electrostatic air charging system includes a primary and secondary electro-forming exciter as described with respect to the previous embodiment. However, according to this embodiment, the secondary electro-forming exciter further includes a secondary electrically conductive element that is operatively disposed within the secondary chamber and a secondary electrode bundle that is operatively connected to the secondary electrically conductive element to electrostatically charge the particles within a positive crankcase ventilation system. The system according to this embodiment further includes an electrostatic charging assembly further includes an electric voltage source control module that is operatively connected to the secondary electro-forming exciter and adapted to direct current from a electric source to the electrode bundle to electrostatically charge the particles within a positive crankcase ventilation system. The control module includes at least one high voltage generator that provides high voltage current and at least one switch that is adapted to control the amplitude, duration, polarity and duty cycle and cycle time of the high voltage current.

Thus, one advantage of the present invention is that the electrostatic charging system provides an optimally charged air and oil vapors that bonds to atomized fuel within the combustion chamber for improved combustion efficiency.

Another advantage of the present invention is that it electrostatically charges the air/fuel mixture at the particle level so that it does not recombine back into its constituent parts during cylinder compression.

Yet another advantage of the present invention is that it includes an electro-forming exciter that charges the oil film vapor returning to the air intake for improved homogonous fuel-air mixture to be directed into the combustion chamber for greater fuel atomization.

Still another advantage of the present invention is that it energizes an electrically conductive element with either a control module varying the amplitude, duration, polarity and duty cycle of the charge, or using the natural voltage of the vehicles alternator charging system to subject vapors to an electrostatic charge to improve fuel-air bonding.

Still another advantage of the present invention is that it includes an electro-forming exciter that is disposed within the positive crankcase ventilation duct to causes fuel particles to acquire an ionic charge upon leaving the fuel injector to prevent fuel particles from sticking together to form fuel globules that would result in inefficient fuel combustion.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
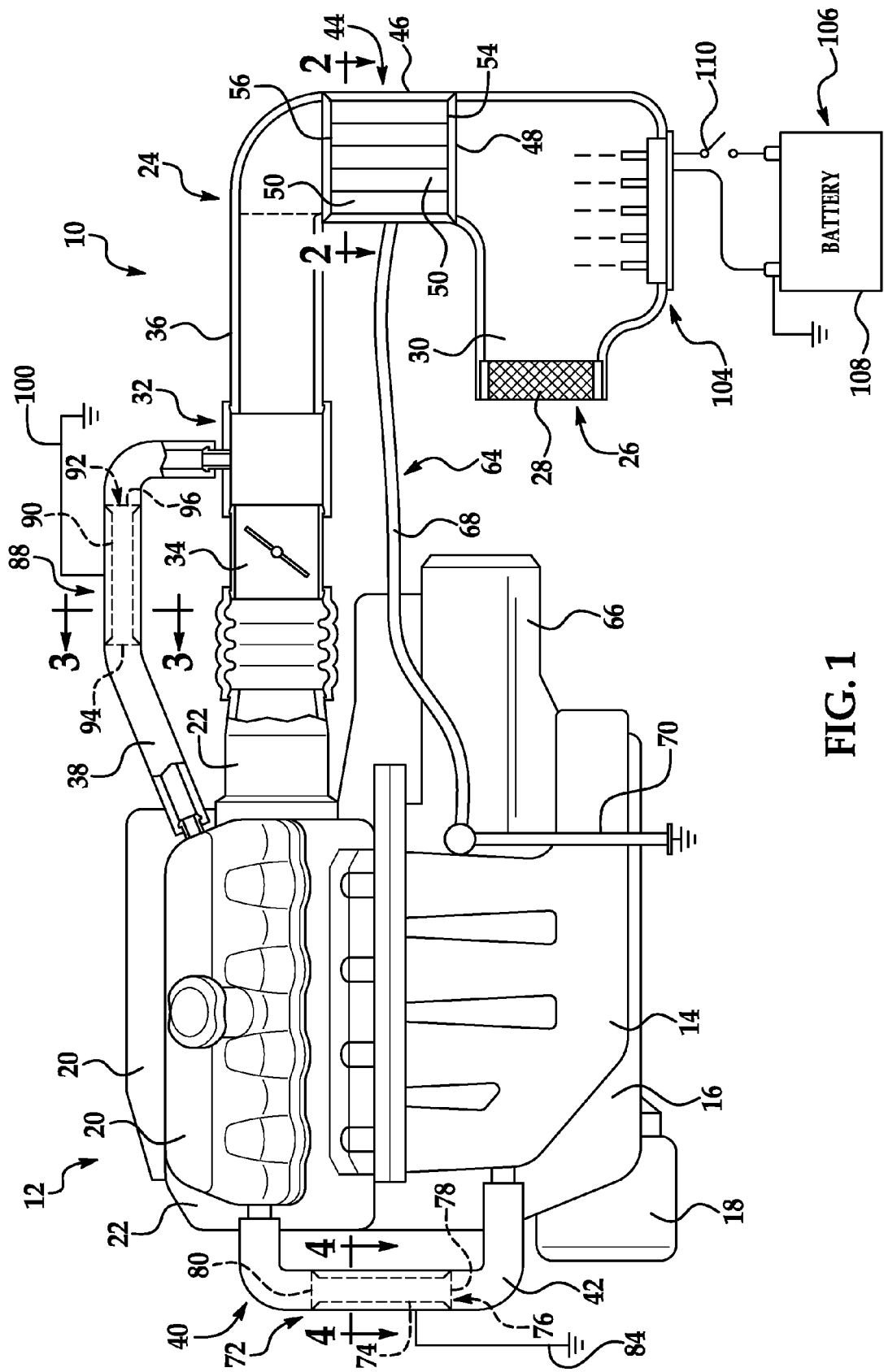
FIG. 1 a partial cross-sectional side view of an internal combustion engine having an electrostatic air charging system in accordance with one embodiment of the present invention installed thereon.

Referring now to the Figures, where like numerals are used to designate like structure, one embodiment of the electrostatic air charging system is generally indicated at 10 in FIGS. 1-4 (hereinafter referred to as the "charging system"). As shown in FIG. 1, the present invention is particularly adapted for use in an internal combustion engine, generally indicated at 12. In this case, the assembly 10 of the present invention is illustrated in connection with a multi-cylinder internal combustion engine 12. Those having ordinary skill in the art will appreciate that the engine 12 is but one of the many internal combustion engines with which the present invention may be employed. By way of example, the present invention may be employed in a two-stroke or four-stroke engine or either type of engine having a single or dual overhead cam assembly or under-mount cam assembly. Further by way of example, the engine 12 may include cylinders arranged in an in-line, v-shaped, or flat manner or in any other manner commonly known in the art.

The internal combustion engine 12 shown in FIG. 1 includes an engine block 14 having a crankcase 16 depending therefrom that houses the crankshaft (not shown) and other internal engine components that couple to the remaining elements of a vehicle's powertrain. By way of example, the crankcase 16 and engine block 14 house one or more connecting rods that link a piston (not shown) to the crankshaft (not shown). The engine 12 further includes an oil pan 18 that retains oil to be distributed to the internal components within the engine block 14 and crankcase 16.

The engine 12 further includes a cylinder head/valve cover 20 operatively attached thereto and a manifold assembly 22 to direct air/fuel mixture into the cylinder head 20 for combustion within the combustion chambers (not shown) that are defined within the engine 12 and/or cylinder head 20. Although not shown in the figures, those having ordinary skill in the art will appreciate that an internal combustion engine 12 includes a plurality of internal components that cooperate to define a combustion chamber such as a piston head, cylinder wall, cylinder head, intake valve and exhaust valve. The internal combustion engine 12 may also include spark plugs (not shown) for igniting the fuel within the combustion chamber. The engine 12 may further include a fuel injector (not shown) as a means of introducing atomized fuel into the combustion chamber. Thus, the present invention may be employed in connection with both a spark ignition or compression ignition (diesel) engine. Furthermore, those having ordinary skill in the art will appreciate that the engine 12 also includes a number of other conventional components that are commonly known in the art and that will not be described in detail here.

As generally noted above, the fuel/air mixture is combusted within the combustion chamber to create pressure that will drive the piston and remaining downstream components of the vehicle's powertrain. To this end, the engine 12 further includes an air intake assembly, generally indicated at 24. The air intake assembly 24 is adapted to direct air into the manifold assembly 22. The air intake assembly 24 includes an open end, generally indicted at 26 and an air filter 28 that is operatively disposed within the open end 26. The air filter 28 is adapted to filter ambient air that will be directed toward the manifold assembly 22. More specifically, the air filter 28 is adapted to prevent infiltration of harmful debris and particles that would aversely affect the combustion of the air/fuel mixture and/or operation of the engine 12. The air intake assembly 24 further includes an air box 30 that is adapted to house the air filter 28 and collect air to be directed toward the manifold assembly 22. The air box 30 and air filter 28 are generally located in proximate relation to the engine 12 within the engine compartment (not shown) of a vehicle. Accordingly, those having ordinary skill in the art will appreciate that the air box 30 may include any shape or configuration that will accomplish the intended objective of directing air toward the manifold assembly 22 within the space (footprint) allocated for the same within the engine compartment of a vehicle.

The air intake assembly 24 further includes a throttle body, generally indicated at 32. The throttle body 32 is operatively connected to the manifold assembly 22 and adapted to introduce air into the manifold assembly 22 in response to input from the operator of a vehicle. More specifically, as the vehicle operator engages the accelerator or gas pedal of the vehicle (not shown), the throttle body 32 delivers an appropriate amount of air toward the manifold assembly 22 for combustion within one or more combustion chambers. Accordingly, the throttle body 32 includes a control valve 34 to deliver the air to the manifold assembly 22. The air intake assembly 24 further includes an air duct 36 that is disposed between the air box 30 and the throttle body 32 to facilitate the transfer of air from the air box 30 to the throttle body 32.

Those having ordinary skill in the art will appreciate that during operational movement of the components within the engine 12 that are necessary to facilitate combustion, a certain amount of air and/or air/gas mixture will become trapped behind the intake valves as they close to define a particular combustion chamber. The trapped air is commonly referred to as "blow back gas." To this end, the air intake assembly 24 further includes a transfer duct 38 that returns blow back gases to the air duct 36 for re-introduction to the throttle body 32.

Additionally, the pressure within the combustion chamber can cause the non-combusted air/fuel mixture located therein to pass by the piston rings (not shown) and be directed into the crankcase 16. The air that passes by the piston rings and into the crankcase 16 is also commonly referred to as "blow back gas." However, this type of blow back gas is known to contain a certain amount of fuel and/or oil vapor and thus, commonly referred to a "dirty blow back gas." Those having ordinary skill in the art will appreciate that an engine 12 further includes a positive crankcase ventilation (PCV) system, generally indicated at 40. The PCV system 40 is adapted to transfer dirty blow back gases from the crankcase 16 to the cylinder head 20 for re-introduction into the combustion chamber. As shown in FIG. 1, the engine 12 includes a PCV system 40 having a return duct 42 to facilitate the transfer of dirty blow back gases from the crankcase 16 to the cylinder head 20. Although not shown in the figures, those having ordinary skill in the art will appreciate that a valve may be operatively disposed within the PCV system 40 to regulate movement of the dirty blow back gases.

Referring to FIGS. 1-4A, the air charging system 10, according to one embodiment of the present invention, is generally shown operatively attached to a portion of the air intake system 24 and PCV system 40 of the engine 12. Those having ordinary skill in the art recognize that ions are produced during combustion—negative ions are largely captured by the boundary layer of oil film on the engine 12 walls and positive ions are largely removed via exhaust gases following combustion. The charging system 10 electrostatically charges air, air/fuel and air/fuel/oil vapor particles to improve air/fuel combustion within the combustion chamber by utilizing the ionization within the engine 12 in combination with the fair-weather electric field effect phenomenon discovered by Lemonnier and Beccaria. The fair-weather electric field effect phenomenon indicates that the earth is covered in a sea of positive and negative ions.

Referring specifically to FIG. 1, the charging system 10 includes a primary electro-forming exciter (PEFE), generally indicated at 44. The PEFE is operatively disposed within the air intake system 24. As shown in FIG. 1, the PEFE 44 is disposed between the air box 30 and the air duct 36. At this location, the PEFE 44 is "downstream" of the air filter 28 and receives the benefit of encountering filtered air as a result. Moreover, this location provides enables the PEFE 44 to provide a seal between the air box 30 and the air duct 36. Finally, this location is suitable for installing the present invention as part of the original vehicle equipment or as an aftermarket component. However, those having ordinary skill in the art will appreciate that the PEFE 44 of the present invention may be installed at other locations within the air intake system 24. By way of example, the PEFE 44 may be installed "upstream"/in front of the air filter 28 or may be installed between the throttle body 32 and the air duct 36.

The PEFE 44 includes an outer shell 46 that provides a mounting surface through which the PEFE 44 may be installed within the air intake assembly 24 and is further adapted to contain the components within the PEFE 44 in proper orientation, as will be described in detail below. The outer shell 46 includes a peripheral sealing member 48 that is adapted to prevent air from leaking out of the air intake assembly 24 and also directs the air flow into the PEFE 44. Those having ordinary skill in the art will appreciate that the outer shell 46 may be constructed from any material suitable for installation within the air intake assembly 24. By way of example, the outer shell 46 may be constructed from polymer or metal materials that do not interfere with the electro-forming nature of the present invention, as will be described in detail below.

Figure 2:
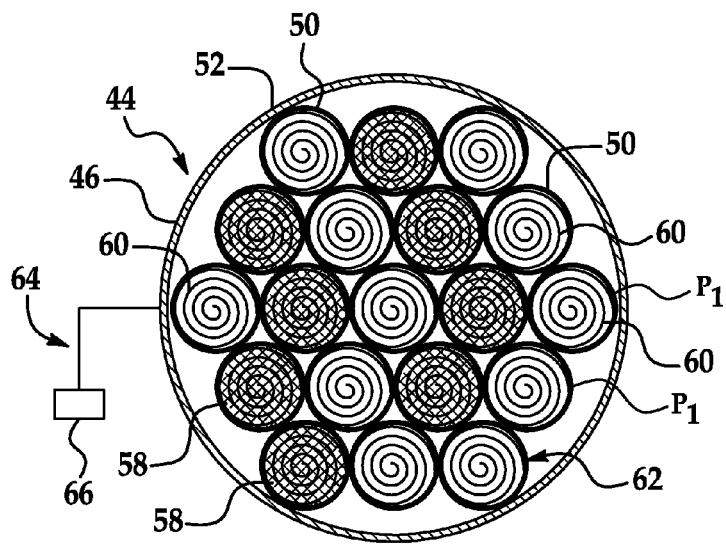
FIG. 2 is a cross-sectional view of the primary electro-forming exciter of the electrostatic air charging system in accordance with the embodiment illustrated in FIG. 1 along line 2.

Referring specifically to FIG. 2, the PEFE 44 includes a plurality of tubes 50 that are fixed in predetermined spatial relationship with respect to each other and oriented parallel to the direction of air flow within the air intake assembly 24. Each tube 50 defines a chamber 52 having an inlet 54 and an outlet 56. The tubes 50 are constructed from a metal such as copper or aluminum. However, those having ordinary skill in the art will appreciate that other metals or alloys may be used. Each of the tubes 50 further includes a screen 58 operatively disposed across the inlet 54 and the outlet 56. For purposes of illustration and disclosure, some of the tubes 50 shown in FIG. 2 do not include a screen 58. However, it should be appreciated that the embodiment of the present invention includes screens 58 operatively disposed on the inlet 54 and outlet 56 of each tube 50. The screen 58 is adapted to provide increased electrostatic conductivity for improved charging efficiency. Furthermore, the screens 58 are constructed from a non-metallic material such as nylon, polyester or silk and further serve to provide a filtration barrier to prevent undesirable material from entering and exiting the tubes 50. Those having ordinary skill in the art will further appreciate that the screen 58 located across the outlet 56 of each of the tubes 50 may be removed without departing from the scope of the invention.

With continuing reference to FIG. 2, the PEFE 44 further includes a plurality of electrically conductive elements 60 that are adapted to electrostatically charge the air within the air intake assembly 24. More specifically, the number of electrically conductive elements 60 corresponds to the number of tubes 50 within the PEFE 44 and each one of the electrically conductive elements 60 is operatively disposed within the chamber 52 defined by the tube 50. Furthermore, the electrically conductive elements 60 are coiled within the chamber 52 for a predetermined number of rotations. It should be appreciated that each electrically conductive element 60 is coiled the same predetermined number of rotations within each chamber 52 and that the predetermined number of rotations can be dependent on the diameter of tube 50. By way of example, each electrically conductive element 60 may be coiled within a chamber 52 to provide 4-6 rotations within a given diameter tube 50, so as to provide satisfactory air flow.

As shown in FIG. 2, the electrically conductive elements 60 within the PEFE 44 are coiled in a clockwise rotation. Additionally, the electrically conductive elements 60 are constructed from a metallic mesh substrate such as copper or aluminum to provide improved conductivity. More specifically, the electrically conductive elements 60 are constructed from a diamond-patterned copper mesh material. However, those having ordinary skill in the art will appreciate that the electrically conducive elements 60 may be constructed from a combination of material having a similar or dissimilar pattern than described above, provided that the alternative material is capable of conducting an electric current in the manner describe with respect to the present invention. Each of the electrically conductive elements 60 operatively engages a tube 50 at a contact point ($P_1$) to define a predetermined angle of incidence (AOI) for improved conductivity. The predetermined AOI for each electrically conductive element 60 is 40°±5° relative to the tube 50.

Referring back to FIG. 1, the electrostatic air charging system further includes an electric voltage conduit, generally indicated at 64, that is operatively connected to the PEFE 44. The voltage conduit 64 is adapted to direct current from a voltage source to the PEFE 44, namely to the electrically conductive elements 60. In the illustrative embodiment, the PEFE 44 is adapted to electrostatically charge the air via low voltage current within a predetermined range of 12-56V. As a result, the PEFE 44 of this embodiment is operatively linked to a vehicle's alternator charging system 66. To this end, the electric voltage conduit includes a ⅝ wavelength electrostatic strap 68 that operatively connects the PEFE 44 to the alternator charging system 66. Those having ordinary skill in the art will appreciate that an electric voltage conduit that provides a different wavelength may be employed without departing from the scope of the invention. By way of example a ⅜ or ⅞ ground strap may be employed in connection with the present invention.

The electric voltage conduit further includes a ground strap 70 that is operatively attached to the chassis of the vehicle and in communication with the PEFE by way of the alternator charging system 66 and electrostatic conduit 68. However, those having ordinary skill in the art will appreciate that the alternative electric voltage source may be employed for use in connection with providing the PEFE 44 with low voltage current within the predetermined range. Furthermore, those having ordinary skill in the art will appreciate that the electrostatic strap 68 and ground strap 70 may be defined by a single strap having a point of contact with the voltage source. Further by way of example, the PEFE may be adapted to receive low voltage current via a control module and/or voltage regulator to provide satisfactory low voltage current to the charging system.

Utilizing the low voltage current supplied through the conduit 68, the PEFE 44 electrostatically charges air traveling through the chambers 52 to generate negatively charged air particles. As the negatively charged air particles enter the combustion chamber, they are attracted to the atomized fuel (which is either positively pre-charged or more negatively charged than the air particles) to form a more homogeneous atomized air/fuel compound within the combustion chamber than the standard/conventional air particles provided by conventional air intake assemblies 24. A greater amount of homogeneous air/fuel particles within the combustion chamber will provide improved combustion efficiency resulting in greater fuel economy and less exhaust pollutants. Additionally, the clockwise rotation of the electrically conductive elements 60 directs the ionized air particles away from the walls of the air duct 36 and/or cylinder head 20 to increase the likelihood that the properly charged air particles will bond with the fuel particles in the combustion chamber, as will be described in greater detail below.

Figure 4:
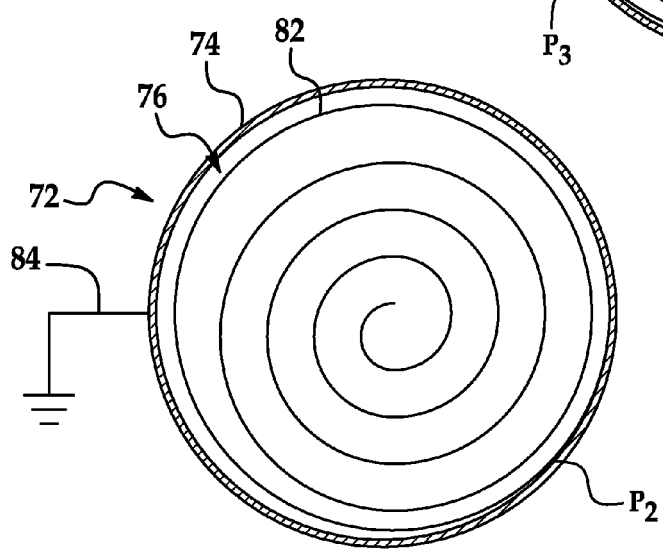
FIG. 4 is a cross-sectional view of the secondary electro-forming exciter of the electrostatic air charging system in accordance with the embodiment illustrated in FIG. 1 along line 4.
Figure 5:
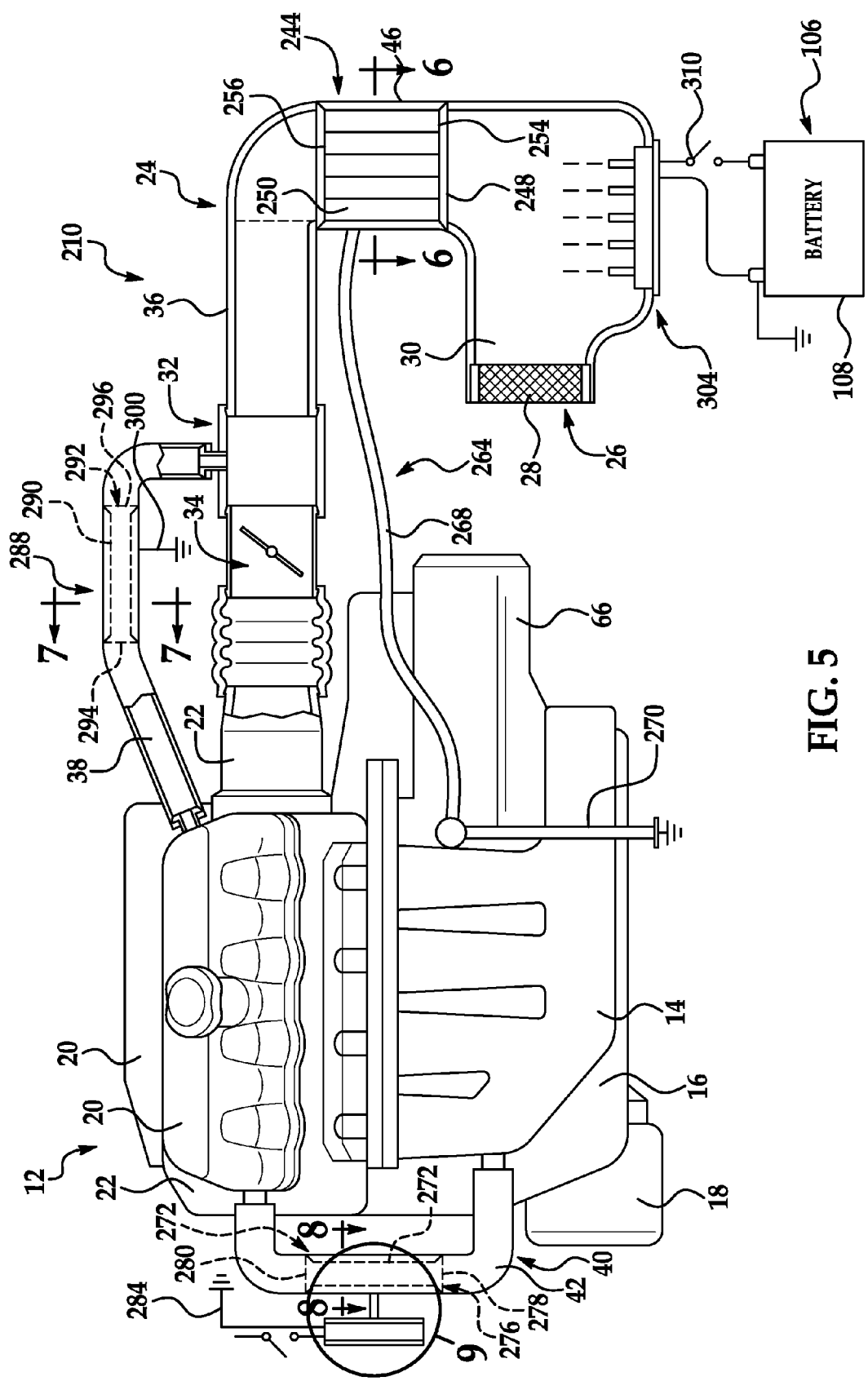
FIG. 5 is a partial cross-sectional side view of an internal combustion engine having an electrostatic air charging system in accordance with another embodiment of the present invention installed thereon.
Figure 4A:
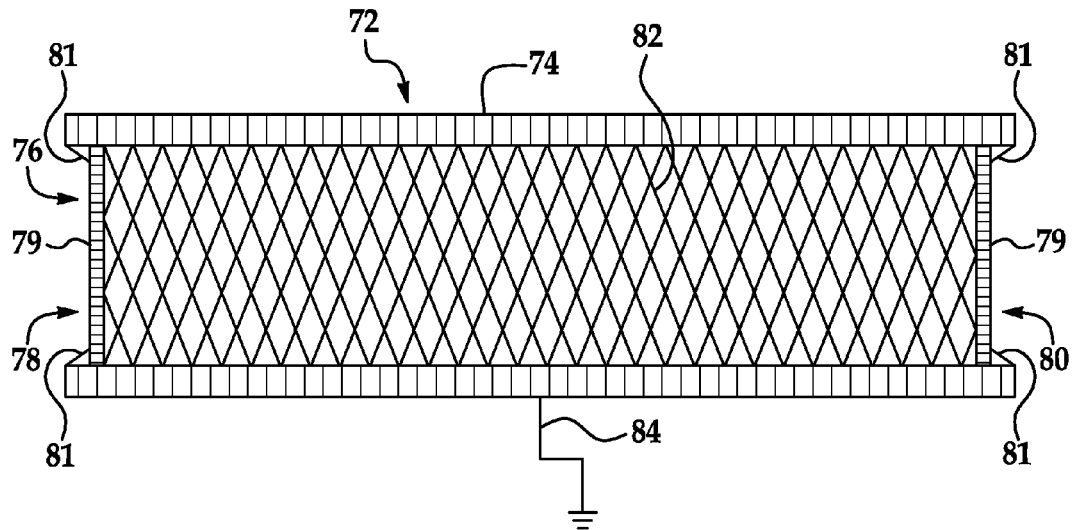
FIG. 4A is a longitudinal cross-sectional view of the secondary electro-forming exciter of the electrostatic air charging system in accordance with the embodiment illustrated in FIG. 1.
Figure 6:
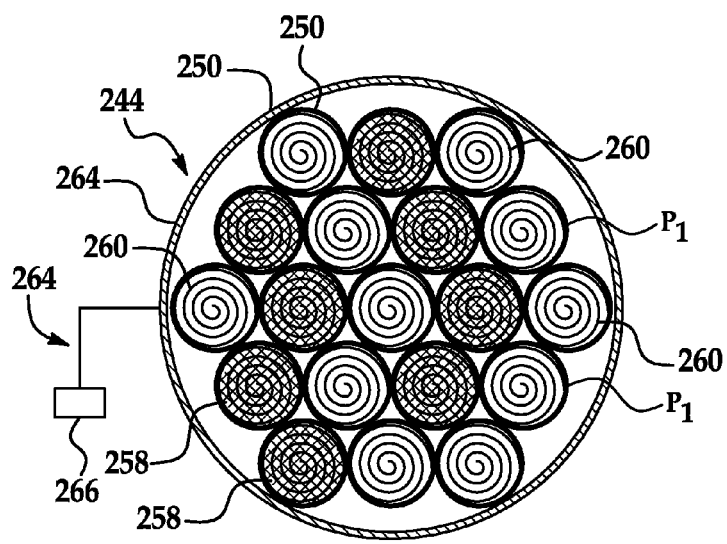
FIG. 6 is a cross-sectional view of the primary electro-forming exciter of the electrostatic air charging system in accordance with the embodiment illustrated in FIG. 5 along line 6.
Figure 7:
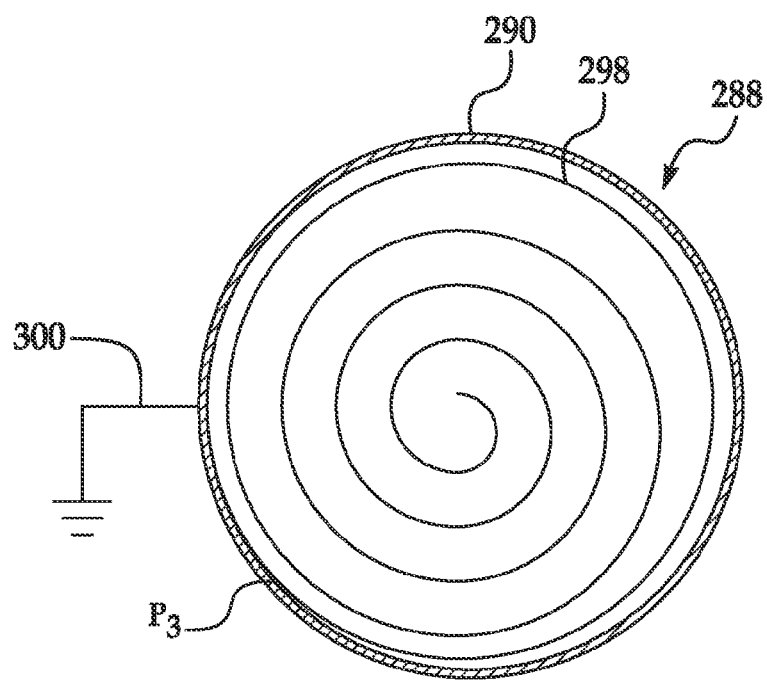
FIG. 7 is a cross-sectional view of the tertiary electro-forming exciter of the electrostatic air charging system in accordance with the embodiment illustrated in FIG. 5 along line 7.
Figure 8:
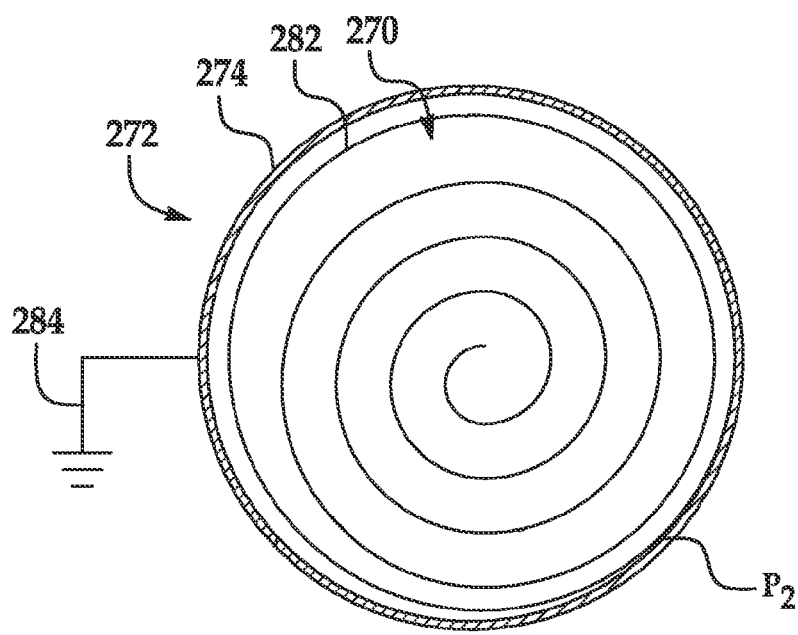
FIG. 8 is a cross-sectional view of the secondary electro-forming exciter of the electrostatic air charging system in accordance with the embodiment illustrated in FIG. 5 along line 8.

Referring to FIGS. 1, 4 and 4A, the electrostatic air charging system 10 further includes a secondary electro-forming exciter (SEFE), generally indicated at 72. The SEFE 72 is operatively disposed within the return duct 42 of the PCV system 40. The SEFE 72 includes structure that is similar to the PEFE 44 with the exception that the SEFE 72 contains only a single tube having a single electrically conductive element that is operatively connected to a single bundle of electrodes, to be described. With specific reference to FIG. 1, the SEFE 72 includes a secondary tube 74 having a secondary chamber 76 defined therein that includes an inlet 78 and an outlet 80.

The SEFE further includes a secondary electrically conductive element 82 that is adapted to electrostatically charge the air within the PCV system 40 that is traveling from the crankcase 16. The secondary electrically conductive element 82 is operatively disposed within the secondary chamber 76 in a coiled manner having a predetermined number of rotations. However, unlike the coiled electrically conductive elements 60 within the PEFE 44, the secondary electrically conductive element 82 within the SEFE 72 is coiled in a counter-clockwise rotation and operatively engages the secondary tube 74 at a contact point ($P_2$) to define a predetermined angle of incidence (AOI) for improved conductivity. The predetermined AOI for the secondary electrically conductive element 82 is 40°±5° relative to the secondary tube 74.

Referring specifically to FIG. 4A, the SEFE 72 further includes screens 79 that are operatively disposed across the inlet 78 and outlet 80. The screens 79 are adapted to perform the same function and provide the same advantages as described with respect to the screens 58 within the PEFE 44. Accordingly, the description and alternatives provided with respect to the screens 58 within the PEFE 44 are incorporated by reference with respect to the screens 79 as though fully set forth herein. Is should further be appreciated that the cross-sectional view of the SEFE 72 illustrated in FIG. 4A is representative of the construction of all of the tubes 50 and electrically conductive elements 60 within the PEFE 44 as well as the tube and electrically conductive element for the tertiary electro-forming exciter, as described in greater detail below. To this end, the tube 74 of the SEFE 72 further includes seals 81 that are adapted to retain the screens 79 and that similar seals are provided within the tubes 50 of the PEFE and tube of the tertiary electro-forming exciter, to be described.

As shown in FIGS. 1, 4 and 4A, the SEFE 72 further includes an electric ground connection 84 to electrostatically charge the electrically conductive element 82 within the secondary tube 74. More specifically, the electric ground connection 84 operatively attaches the SEFE 72 to the chassis of a vehicle. In this regard, the SEFE 74 does not require an electric voltage conduit that is operatively connected to a voltage source like the PEFE 44. More specifically, the PEFE 44 is adapted to electrostatically charge air within the air intake assembly 24 while the SEFE 72 is adapted to electrostatically charge air within the PCV system 40. Those having ordinary skill in the art will appreciate that the air within the air intake assembly 24 in proximate relation to the air box 30 is generally different than air traveling from the crankcase 16 within the PCV system 40. The air within the PCV system 40 is generally oil vapor and/or an atomized air/fuel compound that previously received an electrostatic charge from the PEFE 44 resulting in the acquisition of a (+) or (−) ionic charge.

The interior wall of the return duct 42 will generally include a boundary layer of oil that will conduct a charge received by the secondary electrically conductive element 82 and carry that charge via longitudinal conductance toward the cylinder head 20. Those having ordinary skill in the art will appreciate that the boundary layer of oil film along the crankcase wall and, thus, along return duct 42 is generally negatively charged. Since like charges repel, the negatively charged boundary layer prevents the negatively charged air/fuel particles within the PCV system 40 from sticking to form fuel globules (fuel particles collide and form larger particles which are not optimum for combustion).

Figure 3:
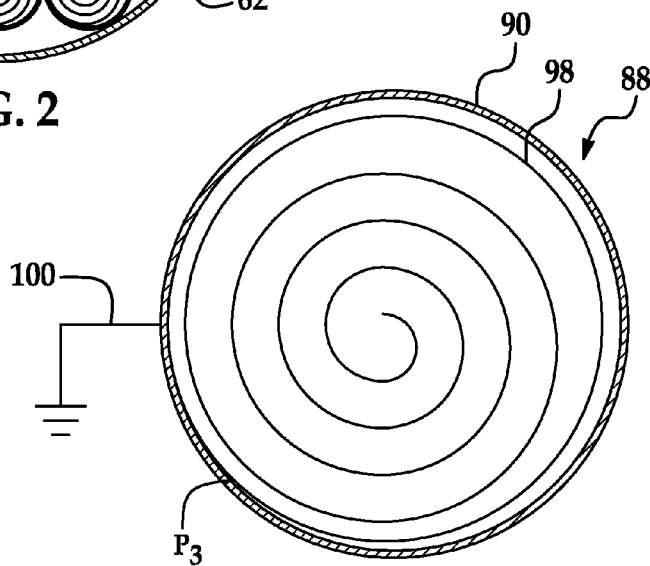
FIG. 3 is a cross-sectional view of the tertiary electro-forming exciter of the electrostatic air charging system in accordance with the embodiment illustrated in FIG. 1 along line 3.

The electrostatic air charging system 10 further includes a tertiary electro-forming exciter (TEFE), generally indicated at 88. The TEFE 88 is operatively disposed within the transfer duct 38 of the air intake assembly 24 and is adapted to electrostatically charge the air within the air intake system 24 that is traveling through the transfer duct 38 toward the air duct 36. Referring to FIGS. 1 and 3, the TEFE 88 includes structure that is similar to the PEFE 44 with the exception that the TEFE 88 contains only a single tube having a single electrically conductive element that is operatively connected to a single bundle of electrodes. With specific reference to FIG. 1, the TEFE 88 includes a tertiary tube 90 having a tertiary chamber 92 defined therein that includes an inlet 94 and an outlet 96.

Referring specifically to FIG. 3, the TEFE 88 further includes a tertiary electrically conductive element 98 that is adapted to electrostatically charge the air within the transfer duct 38 that is traveling from the cylinder head 20. The tertiary electrically conductive element 98 is operatively disposed within the tertiary chamber 92 in a coiled manner having a predetermined number of rotations. Similar to the coiled electrically conductive elements 60 within the PEFE 44, the tertiary electrically conductive element 98 within the TEFE 88 is coiled in a clockwise rotation and operatively engages the tertiary tube 90 at a contact point ($P_3$) to define a predetermined angle of incidence (AOI) for improved conductivity. The predetermined AOI for the tertiary electrically conductive element 98 is 40°±5° relative to the tertiary tube 90.

The TEFE 88 further includes an electric ground connection 100 to electrostatically charge the electrically conductive element 98 within the tertiary tube 74. In this regard, the TEFE 88 does not require an electric voltage conduit that is operatively connected to a voltage source like the PEFE 44. Rather, the TEFE 88 is adapted to electrostatically charge air within the transfer duct 38 via connection to the chassis of a vehicle. Those having ordinary skill in the art will appreciate that the air within the transfer duct 38 may include a portion of atomized air/fuel compound that has previously received an electrostatic charge from the PEFE 44 resulting in the acquisition of a (+) or (−) ionic charge. In order to maintain combustion efficiency within the internal combustion chamber, the TEFE 88 operates to maintain the acquisition of the (+) or (−) charge of the atomized air/fuel compound by orienting the tertiary electrically conductive element 98 in a clockwise rotation.

Referring back to FIG. 1, the electrostatic air charging system 10 further includes an ion generator, generally indicated at 104, operatively disposed within the air box 30. The ion generator 104 is adapted to prevent boundary layer moisture formation from accumulating within the air intake system 24. More specifically, the ion generator 104 includes a plurality of electrodes that are adapted to dry the air within the air intake system 24 to provide optimum ionization of the air particles for improved combustion efficiency. The ion generator 104 is operatively connected to a power source, generally indicated at 106, in order to accomplish its intended objective. As shown in FIG. 1, the ion generator 104 is operatively connected to the battery 108 of the vehicle and includes a switch 110 that to selectively engaging the ion generator 104. Those having ordinary skill in the art will appreciate that the ion generator 104 may include a manual switch or an automated switch that is operatively connected to the vehicles ignition or other device for providing activation of the ion generator without active participation by the vehicle operator or occupant. By way of example, the ion generation of the present invention may be connected to the vehicle's ambient temperature gauge and adapted to activate the ion generator when the ambient temperature is within or outside of a predetermined temperature range. In either event, the air ion generator 104 is adapted to charge the air within the air intake system 24 to near zero or slightly minus and cooperate with the PEFE 44 to generate oppositely charged air particles that are attracted to pre-charged fuel particles, thereby further aiding in homogeneous mixing and making an electroformed air/fuel compounds.

Referring to the embodiment illustrated in FIGS. 5-9 another embodiment of the electrostatic air charging system of the present invention is generally indicated at 210 where like numerals, increased by 200 with respect to the embodiment of the invention illustrated in FIGS. 1-4, are used to designate like structure. The charging system 210 shown in FIGS. 5-9 is similar to the charging system 10 shown in FIGS. 1-4 and so the description of the illustrated structure will not be repeated here except where expressly mentioned below. More specifically, the embodiment illustrated in FIGS. 5-9 includes a PEFE 244 and ion generator 304 disposed between the air filter 28 and air duct 36 as well as a TEFE 288 that is disposed within the transfer duct 38 of the air intake assembly 24. The PEFE 244, ion generator 304 and TEFE 288 of the embodiment illustrated in FIGS. 5-9 are adapted to accomplish the same objective and provide the same function as the PEFE 44, ion generator 304 and TEFE 88 described with respect to the embodiment illustrated in FIGS. 1-4.

However, unlike the SEFE 72 described with respect to the embodiment illustrated in FIGS. 1-4, the SEFE 272 further includes a secondary electrode bundle, generally indicated at 286. The secondary electrode bundle 286 is defined by a predetermined number of electrodes 286A-F that are operatively connected to the secondary electrically conductive element 282. More specifically, the secondary electrodes 286A-F are fixed within the secondary chamber 276 in a predetermined spatial relationship relative to each other and adapted to direct an electric charge onto the secondary electrically conductive element 282 to facilitate electrostatically charging the air that is received through the secondary chamber 276.

Additionally, the SEFE 272 is operatively engaged to an electric voltage source control module, generally indicated at 400 (hereinafter referred to as the "control module"). The control module 400 is operatively connected to the SEFE 272 to direct high voltage current within a predetermined range of 1.5-6 kV from at least one voltage source 106 to the electrode bundle 286 to electrostatically charge the air within the PVC system 40. More specifically, the control module 400 is adapted to control the amplitude, duration, polarity and duty cycle and cycle time of the current directed toward the electrode bundle 286. Those having ordinary skill in the art will appreciate that the control module 400 may be preprogrammed to control the amplitude, duration, polarity and duty cycle and cycle time of the current or customizable by the end user or vehicle manufacturer. Furthermore, those having ordinary skill in the art will appreciate that the control module 400 may be operatively linked to a the onboard computer of a vehicle to provide information regarding the amplitude, duration, polarity and duty cycle and cycle time of the current directed toward the SEFE 272.

Figure 9:
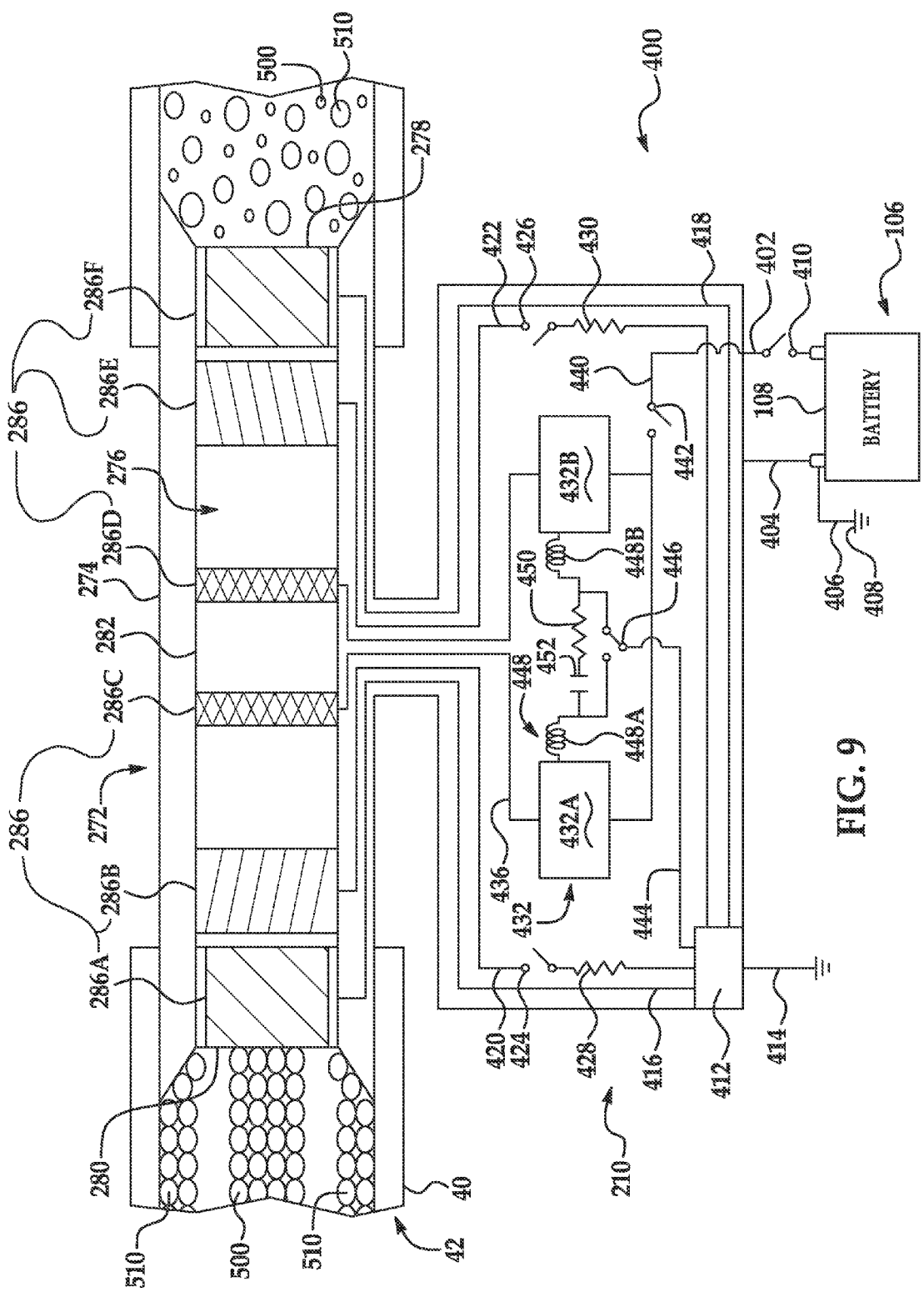
FIG. 9 is an enlarged cross-sectional view of the secondary electro-forming exciter and control module of the electrostatic air charging system in accordance with the embodiment illustrated in FIG. 5.

Referring specifically to FIG. 9, the control module 400 is operatively connected to a battery 108 within a vehicle through a positive connection 402 and a negative connection 404 that also includes a connection 406 to the battery ground 408. The positive connection 402 includes an ignition relay 410 that connects the battery 108 to the control module 400 when the vehicle is operational (i.e. "running"). The control module 400 further includes a ground relay 412 that is adapted to provide connection to a direct ground through a ground connection 414. The control module 400 further includes direct ground connections 416 and 418 that are operatively connected to electrodes 286A and 286F, respectively. The control module 400 further includes electrode connections 420 and 422 that operatively connect electrodes 286B and 286E, respectively, to the ground relay 412. Those having ordinary skill in the art will appreciate that the electrodes 286B and 286E may be operatively connected to a direct ground via the same contact point or at different contact points. The electrode connections 420 and 422 further include switches 424 and 426 that are adapted to selectively connect the electrodes 286B and 286E to a direct ground. The switches 424 and 426 are adapted to control the timing that current is directed toward the electrodes 286B and 286E, respectively. The electrode connections 420 and 422 further include at least one resistor 428 and 430 that is operatively disposed between the direct ground connection 414 and the electrode 286B and 286E, respectively. The resistors 428 and 430 may include any type of resistor that will provide the appropriate level of current to the electrodes 286B and 286E. In the embodiment illustrated in FIGS. 5-9, the resistors 428 and 430 are shunt resistors that are adapted to provide at least 5 megaohm resistance.

The control module 400 further includes at least one high voltage generator, generally indicated at 432, that provides high voltage current within a predetermined range of 3-6 kV to electrodes 286C and 286D. As shown in FIG. 9, the control module 400 includes two high voltage generators 432A and 432B that are connected to the electrodes 286C and 286D, respectively, by high voltage connections 436 and 438, respectively. The high voltage generators are further connected to a battery 108 and each other 432A and 432B through a connection 440 having a switch 442 that is adapted to control the cycle time that current is directed from the battery 108 to the high voltage connections 432A and 432B. The high voltage generators 432A and 432B are further connected to a ground connection 414 by a negative connection 444. The control module 400 further includes a polarity switch 446 that is operatively disposed between high voltage generators 432A and 432B and the negative connection 444 to control the polarity of the current directed toward the electrodes 286C and 286D. The switch 442 and the polarity switch 446 cooperate to control duty cycle and cycle time that high voltage current that is directed toward electrodes 268C and 268D.

The control module 400 further includes at least one inductor, generally indicated at 448, that is operatively disposed between the high voltage generators 432A and 432B. As show in FIG. 9, the control module 400 includes two inductors 448A and 448B between the high voltage generators 432A and 432B. The inductors 448A and 448B that are operatively disposed within the embodiment of the present invention illustrated in FIGS. 5-9 include an inductance range between 4 and 8 microHernies. More specifically, the inductors 448A and 448B include an inductance of 6.8 microHernies. The control module 400 further includes a resistor 450 and a capacitor 452 that are disposed between the inductors 448A and 448B. The resistor 450 is adapted to facilitate the connection between the high voltage generators 432A and 432*b* and the ground connection 412 in response to a predetermined number of cycles that high voltage current is directed toward the electrodes 286C and 286D. The resistor 450 that is disposed between the high voltage generators 432A and 432B is a shunt resistor that is adapted to provide at least 5 megaohm resistance. Additionally, the capacitor 452 is operatively disposed between the high voltage generators 432A and 432B is a coupling capacitor that is adapted to provide at least 0.22 microfarad capacitance.

Those having ordinary skill in the art will appreciate that the PEFE 244 may be operatively connected to the control module 400 to utilize high voltage current to electrostatically charge the air within the air intake system 24 rather than low voltage current. In this manner, the PEFE 244 would include a plurality of electrode bundles that are operatively connected to the electrically conductive elements 260 and oriented relative to each other in the manner described with respect to the electrodes 285A-F within the SEFE 272. Those having ordinary skill in the art will further appreciate that where the PEFE 244 is utilized in connection with a high voltage current, the charging system 210 may include a control module 400 that is bifurcated to provide independent control over the amplitude, duration, polarity and duty cycle and cycle time of the current directed toward the SEFE 272 and the PEFE 244. Alternatively by way of example, the charging system 210 may include separate control modules to provide independent control over the amplitude, duration, polarity and duty cycle and cycle time of the current directed toward the SEFE 272 and the PEFE 244.

As specifically shown in FIG. 9, the return duct 42 generally includes a non-homogeneous blend of oil film 500 and dirty blow back gas 510 that will be directed back toward the cylinder head 20 for possible re-combustion within the combustion chamber of the engine 12. The SEFE 272, operatively attached to a high voltage control module 400, provides for improved homogenization of both the oil film 500 and air/fuel vapor 510. Moreover, as the air/fuel vapor 510 will become negatively charged as it passes through the SEFE 272. Since like charges repel, the SEFE 272 prevents the oil film 500 and air/fuel particles 510 within the PCV system 40 from combining to form fuel globules that would have resulted in inefficient combustion.

Accordingly, the charging system 10 and 210 of the present invention emulsifies air particles, air/fuel compounds and oil vapor electrostatically within the air intake 24 and PCV systems 40 using electrostatic charges, thereby causing an improved homogenous atomized air/fuel compound to stay in suspension during the compression process. Such enhanced emulsification allows the air/fuel mixture to burn more efficiently and completely, thereby improving fuel economy and reducing emissions by significant amounts.

The present invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An electrostatic air charging system for an internal combustion engine comprising:
a primary electro-forming exciter that is operatively disposed within an air intake assembly for an internal combustion engine having a plurality of tubes defining a plurality of chambers each having an inlet and an outlet, a plurality of electrically conductive elements at least one of which is disposed within each of said chambers and adapted to electrostatically charge the air that is received through each of said chambers;
an electric voltage conduit that is operatively connected to said primary electro-forming exciter and an electric source to direct low voltage current from an electric source to said electrically conductive elements to electrostatically charge the air;
a secondary electro-forming exciter that is operatively disposed within a positive crankcase ventilation system for an internal combustion engine and connected to an electrically grounded substrate within a vehicle, said secondary electro-forming exciter having at least one secondary tube that defines a respective secondary chamber having an inlet and an outlet, a respective secondary electrically conductive element that is operatively disposed within said secondary chamber and adapted to electrostatically charge the particles within a positive crankcase ventilation system; and
a tertiary electro-forming exciter that is operatively disposed within a portion of the air intake assembly and connected to an electrically grounded substrate within the vehicle, said tertiary electro-forming exciter having a tertiary tube that includes a tertiary chamber and a tertiary electrically conductive element defined within said tertiary chamber to electrostatically charge the air directed through said tertiary chamber, said tertiary electro-forming exciter cooperating with said primary electro-forming exciter and said secondary electro-forming exciter such that at least some of the air entering the engine for combustion is electrostatically charged by said primary, secondary and tertiary electro-forming exciters.

2. The electrostatic air charging system as set forth in claim 1 wherein said plurality of tubes each further include at least one screen operatively disposed across a respective inlet to provide increased electrostatic conductivity for improved charging efficiency and further provide a filtration barrier to prevent undesirable material from entering said tubes.

3. The electrostatic air charging system as set forth in claim 1 wherein each of said plurality of electrically conductive elements is coiled within a respective chamber in a clockwise configuration having a predetermined number of rotations and operatively engages said tube at a contact point to define a predetermined angle of incidence of 40°±5° to provide for improved conductivity.

4. The electrostatic air charging system as set forth in claim 1 wherein said electric voltage conduit is operatively connected to the alternator system of a vehicle to provide a low voltage current within a predetermined range of 12-56V to said electrically conductive elements.

5. The electrostatic air charging system as set forth in claim 1 wherein said secondary electrically conductive element is coiled within said secondary chamber in a counter-clockwise configuration having a predetermined number of rotations and operatively engages said secondary tube at a contact point to define a predetermined angle of incidence of 40°±5° to provide for improved conductivity.

6. The electrostatic air charging system as set forth in claim 1 further including an ion generator having a plurality of electrodes that are adapted to prevent a boundary layer of moisture formation within the air intake system of an internal combustion vehicle and dry the inducted air within the air intake system, said ion generator being adapted to cooperate with said primary electro-forming exciter to provide ionized air.

7. An electrostatic air charging system for an internal combustion engine comprising:
a primary electro-forming exciter that is operatively disposed within an air intake system for a vehicle and operatively connected to an electrically grounded substrate within a vehicle, said primary electro-forming exciter including a plurality of tubes, each of said tubes having a chamber defined therein, a plurality of electrically conductive elements that are operatively disposed within said chambers and adapted to electrostatically charge the air that is received through said chambers;
a secondary electro-forming exciter that is operatively disposed within a positive crankcase ventilation system for the vehicle, said secondary electro-forming exciter having at least one secondary tube that defines a secondary chamber having an inlet and an outlet, a secondary electrically conductive element that is operatively disposed within said secondary chamber separate from the at least one secondary tube, and a secondary electrode bundle that is operatively connected to said secondary electrically conductive element to electrostatically charge the particles within a positive crankcase ventilation system;
A tertiary electro-forming exciter that is operatively disposed within a portion of the air intake system and connected to an electrically grounded substrate within a vehicle, said tertiary electro-forming exciter having a tertiary tube that includes a tertiary chamber and a tertiary electrically conductive element defined within said tertiary chamber to electrostatically charge the air directed through said tertiary chamber, said tertiary electro-forming exciter cooperating with said primary electro-forming exciter and said secondary electro-forming exciter such that at least some of the air entering the engine for combustion is electrostatically charged by said primary, secondary and tertiary electro-forming exciters; and
an electric voltage source control module that is operatively connected to said secondary electro-forming exciter and adapted to direct current from an electric source to said electrode bundle to electrostatically charge the particles within the positive crankcase ventilation system, said control module including at least one high voltage generator that provides high voltage current and at least one switch that is adapted to control the amplitude, duration, polarity and duty cycle and cycle time of the high voltage current.

8. The electrostatic air charging system as set forth in claim 7 wherein said control module further includes at least one inductor having an inductance range between 4 and 8 microhenries and at least one capacitor having at least 0.22 microfarad capacitance that are operatively disposed between said high voltage generator and an electric source to facilitate the transfer of current within a predetermined range of 1.5-6 kV to said secondary electrode bundle.

9. The electrostatic air charging system as set forth in claim 8 wherein said control module further includes at least one resistor having at least 5 megaohm resistance that cooperates with said inductor and said capacitor to facilitate control of the amplitude, duration, polarity and duty cycle and cycle time of the high voltage current directed toward said secondary electro-forming exciter.

10. The electrostatic air charging system as set forth in claim 7 wherein each of said plurality of electrically conductive elements is coiled within said chamber in a clockwise configuration having a predetermined number of rotations and operatively engages said tube at a contact point to define a predetermined angle of incidence of 40°±5° to provide for improved conductivity.

11. The electrostatic air charging system as set forth in claim 7 wherein said secondary electrically conductive element is coiled within said secondary chamber in a counter-clockwise configuration having a predetermined number of rotations and operatively engages said secondary tube at a contact point to define a predetermined angle of incidence of 40°±5° to provide for improved conductivity.

12. The electrostatic air charging system as set forth in claim 7 further including an ion generator having a plurality of electrodes that are adapted to prevent a boundary layer of moisture formation within the air intake system of an internal combustion vehicle and dry the inducted air within the air intake system, said ion generator being adapted to cooperate with said primary electro-forming exciter to provide ionized air.

13. An electrostatic air charging system for an internal combustion engine comprising:
an electro-forming exciter that is operatively disposed within a positive crankcase ventilation system for a vehicle having at least one secondary tube that defines a secondary chamber having an inlet and an outlet, a secondary electrically conductive element that is operatively disposed within said secondary chamber separate from the at least one secondary tube, and a secondary electrode bundle that is operatively connected to said secondary electrically conductive element to electrostatically charge the particles within a positive crankcase ventilation system;
an electric voltage source control module that is operatively connected to said secondary electro-forming exciter and adapted to direct current from an electric source to said secondary electrode bundle, said control module including at least one switch that is adapted to control the amplitude, duration, polarity and duty cycle and cycle time of the current to said secondary electrode bundle to electrostatically charge particles within a positive crankcase ventilation system that are adapted for combustion to provide greater combustion efficiency of an internal combustion engine;
an electric voltage conduit connected between a voltage source and a plurality of electrically conductive elements within an air intake system for the vehicle to electrostatically charge air in the air intake system; and
a tertiary electro-forming exciter that is operatively disposed within a portion of the air intake system and connected to an electrically grounded substrate within the vehicle, said tertiary electro-forming exciter having a tertiary tube that includes a tertiary chamber and a tertiary electrically conductive element defined within said tertiary chamber having an electrode bundle operatively attached to said tertiary electrically conductive element to electrostatically charge the air directed through said tertiary chamber, said tertiary electro-forming exciter cooperating with said electro-forming exciter such that at least some of the air entering the engine for combustion is electrostatically charged by said electro-forming exciter and by said tertiary electro-forming exciter.

14. The electrostatic air charging system as set forth in claim 13 wherein said secondary electrically conductive element is coiled within said secondary chamber in a counter-clockwise configuration having a predetermined number of rotations and operatively engages said secondary tube at a contact point to define a predetermined angle of incidence of 40°±5° to provide for improved conductivity.

15. The electrostatic air charging system as set forth in claim 13 wherein said control module further includes at least one inductor, at least one capacitor and at least one resistor that are operatively disposed between said high voltage generator and an electric source to facilitate control of the amplitude, duration, polarity and duty cycle and cycle time of electric current directed toward said electro-forming exciter.

16. The electrostatic air charging system as set forth in claim 13 further includes an ion generator having a plurality of electrodes that are adapted to prevent a boundary layer of moisture formation within the air intake system of an internal combustion vehicle and dry the inducted air within the air intake system, said ion generator adapted to cooperate with said electro-forming exciter to improve combustion efficiency within an internal combustion engine.

17. The electrostatic air charging system as set forth in claim 13 further including a ground strap that is operatively connected to said electric voltage source control module and an electrically grounded substrate of a vehicle.

18. The electrostatic air charging system as set forth in claim 1, wherein the secondary electro-forming exciter is operatively disposed within a duct of the positive crankcase ventilation system that facilitates transfer of gases from a crankcase of the engine to an air intake side of the engine, and the tertiary electro-forming exciter is operatively disposed within a duct of the air intake assembly that facilitates transfer of gases from the cylinder head upstream in the air intake assembly.

19. The electrostatic air charging system as set forth in claim 7, wherein the secondary electro-forming exciter is operatively disposed within a duct of the positive crankcase ventilation system that facilitates transfer of gases from a crankcase of the engine to an air intake side of the engine, and the tertiary electro-forming exciter is operatively disposed within a duct of the air intake assembly that facilitates transfer of gases from the cylinder head upstream in the air intake assembly.

20. The electrostatic air charging system as set forth in claim 13, wherein the electro-forming exciter is operatively disposed within a duct of the positive crankcase ventilation system that facilitates transfer of gases from a crankcase of the engine to an air intake side of the engine, and the tertiary electro-forming exciter is operatively disposed within a duct of the air intake assembly that facilitates transfer of gases from the cylinder head upstream in the air intake assembly.

* * * * *